(12) United States Patent
Saikia et al.

(10) Patent No.: US 11,927,097 B2
(45) Date of Patent: Mar. 12, 2024

(54) CABLE HANDLING SYSTEM FOR LONGWALL MINING MACHINES

(71) Applicant: Caterpillar Inc., Peoria, IL (US)

(72) Inventors: Siddartha Saikia, Chennai (IN); Euan Kirkhope, Mayfield (AU); Wilfred Rozario, Chennai (IN); Mahendra Kumar Angamuthu Ganesan, Chennai (IN); Lakshminarayana Padhi, Srikakulam (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/842,942

(22) Filed: Jun. 17, 2022

(65) Prior Publication Data

US 2022/0403738 A1    Dec. 22, 2022

(30) Foreign Application Priority Data

Jun. 17, 2021 (GB) .................................. 2108671

(51) Int. Cl.
*E21C 35/04* (2006.01)
*E21F 17/18* (2006.01)

(52) U.S. Cl.
CPC ............ *E21C 35/046* (2013.01); *E21F 17/18* (2013.01)

(58) Field of Classification Search
CPC ............................... E21C 35/046; E21F 17/18
See application file for complete search history.

(56) References Cited

U.S. PATENT DOCUMENTS 7,793,442 B2   9/2010   Koch
9,920,815 B2   3/2018   Jaeker
(Continued)

FOREIGN PATENT DOCUMENTS

CN   203891880 U   10/2014
CN   110017774 A   7/2019
(Continued)

OTHER PUBLICATIONS

United Kingdom Search Report related to Application No. GB2108671.5 reported on Mar. 4, 2022.
(Continued)

*Primary Examiner* — Janine M Kreck

(57) ABSTRACT

A method of operating a cable handling system of a longwall mining machine having a shearer movable along a pan line to mine material along a mine face, the cable handling system including:
  i) a service line configured to carry one or more supply lines to the shearer for facilitating shearer operation,
  ii) a plurality of interconnected trays to accommodate the service line,
  iii) a plurality of sensor nodes distributed along a length of the service line, and
  iv) a plurality of transceivers distributed along a length of the pan line, the method comprising:
    a) sensing orientation, acceleration and/or position data of the service line using the plurality of sensor nodes,
    b) using the plurality of transceivers to receive the orientation, acceleration and/or position data from the plurality of sensor nodes and to transmit the orientation, acceleration and/or position data to a controller, and
    c) detecting, by the controller, an actual or imminent failure mode of the service line using analysis of the orientation, acceleration and/or position data from the plurality of the sensor nodes.

15 Claims, 4 Drawing Sheets

(56) References Cited

U.S. PATENT DOCUMENTS

| | | | |
|---|---|---|---|
| 10,422,709 B2 | 9/2019 | Zhu | |
| 10,844,713 B2 | 11/2020 | Kirkhope | |
| 2004/0196160 A1* | 10/2004 | Wesselmann | E21D 23/14 |
| | | | 340/870.07 |
| 2019/0326740 A1* | 10/2019 | Hermey | F16G 13/18 |
| 2020/0024943 A1* | 1/2020 | Kirkhope | E21C 35/046 |

FOREIGN PATENT DOCUMENTS

| | | | | |
|---|---|---|---|---|
| GB | 2129032 A | * | 5/1984 | E21C 35/24 |
| WO | WO-2004090375 A1 | * | 10/2004 | F16G 13/16 |

OTHER PUBLICATIONS

Process Safety and Enviromental Protection, vol. 109, 2017, Muduli Lalatendu et al., "A novel wireless sensor network deployment scheme for environmental monitoring in longwall coal mines", pp. 564-576, p. 564, last paragraph—p. 365 paragraph first.

\* cited by examiner

CABLE HANDLING SYSTEM FOR LONGWALL MINING MACHINES

TECHNICAL FIELD

The present disclosure generally relates to cable handling systems in longwall mining machines. More particularly, the disclosure relates to a method of operating a cable handling system of a longwall mining machine and a cable handling system suitable for performing the method.

BACKGROUND TO THE DISCLOSURE

Longwall mining machines generally include a shearer that traverses along an armoured face conveyor (AFC) pan line to cut, extract, and obtain material, from a mine face. Lines supplying various requirements, including electrical power, may be extended to the shearer from a source. Generally, such lines are housed in a trailing cable handling system known as a bretby.

The bretby is commonly constrained within a tray (or a plurality of trays) as part of the longwall pan line. As the shearer moves, the bretby is pulled and folded according to the direction of shearer travel, and during shearer operation, the bretby may be folded and stacked numerous times.

It is important that the bretby remains within the pan line and that, in particular, it does not fall out of the pan line to either side. If the bretby were to fall out of the pan line this would lead to significant down time of the longwall mining machine and mining operations leading to loss of through put. In addition dislodgement of the bretby can lead to damage of the bretby or one or more supplies held by the bretby, e.g. electrical cables, fluid lines, data and communication lines, and the like. Damage may occur, for example, due to contact of the bretby with conveyor or shearer elements of the longwall mining machine.

Foreign objects in the pan line may also cause adverse bending of the bretby, again potential causing the bretby to be dislodged from the pan line.

The need to monitor the bretby has required a human operator to stay underground in proximity to the longwall mining machine to visually monitor the bretby. However, such an arrangement requires the human operator to be present in an environment that is subject to heat, dust, noise and moving machinery.

US 2020/0024943 A1 describes a cable handling system for a longwall mining machine. The longwall mining machine includes a shearer configured to move along a pan line to mine material along a mine face. The cable handling system includes a service line configured to carry one or more supply lines to the shearer for facilitating shearer operation. Further, a plurality of interconnected trays accommodates the service line. Moreover, a controller is configured to determine a profile of the pan line; detect one or more parameters associated with the service line in relation to the profile of the pan line; and determine a likelihood of at least a portion of the service line dislodging from the plurality of interconnected trays based on the one or more parameters exceeding a predefined threshold.

SUMMARY OF THE DISCLOSURE

In a first aspect the present disclosure provides a method of operating a cable handling system of a longwall mining machine having a shearer movable along a pan line to mine material along a mine face, the cable handling system including:

i) a service line configured to carry one or more supply lines to the shearer for facilitating shearer operation,
ii) a plurality of interconnected trays to accommodate the service line,
iii) a plurality of sensor nodes distributed along a length of the service line,
iv) a plurality of transceivers distributed along a length of the pan line, and
v) a controller;
the method comprising:
  a) sensing and transmitting orientation, acceleration and/or position data of the service line using the plurality of sensor nodes,
  b) using the plurality of transceivers to receive the orientation, acceleration and/or position data from the plurality of sensor nodes and to transmit the orientation, acceleration and/or position data to the controller, and
  c) detecting, by the controller, an actual or imminent failure mode of the service line using analysis of the orientation, acceleration and/or position data from the plurality of the sensor nodes.

In a second aspect the present disclosure provides a cable handling system for a longwall mining machine, the longwall mining machine including a shearer configured to move along a pan line to mine material along a mine face, the cable handling system comprising:

i) a service line configured to carry one or more supply lines to the shearer for facilitating shearer operation,
ii) a plurality of interconnected trays to accommodate the service line,
iii) a plurality of sensor nodes distributed along a length of the service line,
iv) a plurality of transceivers distributed along a length of the pan line, and
v) a controller configured to:
  a) receive orientation, acceleration and/or position data of the service line that originates from the plurality of sensor nodes, is transmitted to the plurality of transceivers, and is then transmitted to the controller by the plurality of transceivers, and
  b) analyse the orientation, acceleration and/or position data to detect an actual or imminent failure mode of the service line.

BRIEF DESCRIPTION OF THE DRAWINGS

Aspects and embodiments of the present disclosure will now be described, by way of example only, with reference to the accompanying drawings, in which.

DETAILED DESCRIPTION

The skilled reader will recognise that one or more features of one aspect or embodiment of the present disclosure may be combined with one or more features of any other aspect or embodiment of the present disclosure unless the immediate context teaches otherwise.

Figure 1:
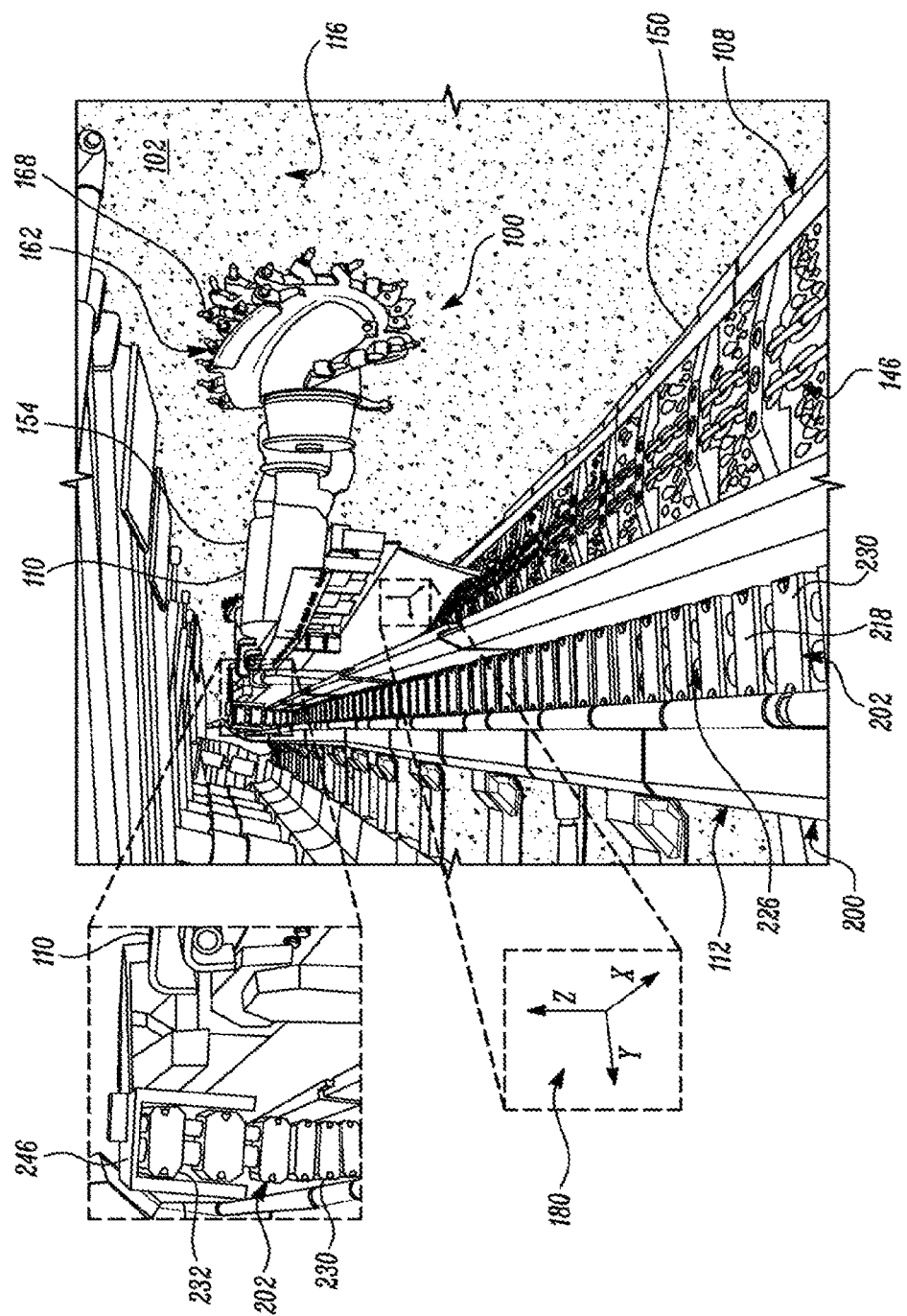
FIG. 1 is an exemplary longwall mining machine that includes a shearer movable along a pan line to extract material from a mine face of an underground mine, in accordance with the present disclosure.

An example apparatus and method in accordance with the present disclosure will now be described with reference first to FIGS. 1 and 2 in which a longwall mining machine 100 is shown. The longwall mining machine 100 may be operated within an underground mine 102, as shown. The longwall mining machine 100 may be used to mine materials, such as coal. Nevertheless, aspects of the present disclosure may be applied to other environments, and may not be limited to the environment set forth in the following description and/or drawings. The longwall mining machine 100 may include a face conveyor 108, a shearer 110, and a cable handling system 112.

The face conveyor 108 may be an armoured face conveyor, and may be disposed and extended along a longwall face or a mine face 116 of the underground mine 102. For example, the face conveyor 108 may extend between a main gate end 120 and a tail gate end 122 (see FIG. 2) of the underground mine 102. The face conveyor 108 may include multiple face conveyor segments, referred to as pans 130. Adjacent pans 130 may be coupled to one another, and multiple interconnected pans 130 may define a pan line 138 of the longwall mining machine 100. The pan line 138 may be arranged in-between two stations, which may respectively accommodate sprockets and similar arrangements to help redirect an endless conveyor chain 146 of the face conveyor 108 along a cyclical path, as is commonly found in conveyor mechanisms. In that manner, the face conveyor 108 is able to transport material extracted and dropped from the mine face 116 to a suitable location. An operation of the endless conveyor chain 146 may be powered by one or more drives (commonly referred to as a main drive and/or an auxiliary drive) (not shown). The face conveyor 108 may include a guide rail 150 defined along a length, L, (see FIG. 2) of the pan line 138. The guide rail 150 may facilitate a movement of the shearer 110 along the pan line 138.

The shearer 110 may be configured to shear material, such as coal, as already noted above, from the mine face 116. To this end, the shearer 110 may be guided on the guide rail 150, and, accordingly, may be traversable over and along the guide rail 150, along the length, L, of the pan line 138. During said travel, the shearer 110 may shear material from the mine face 116. The shearer 110 may include a generally elongated, main body 154, with an end 160 and a first shearer arm assembly 162 that is coupled and moveable relative to the end 160. The shearer 110 may include a similarly arranged, second arm assembly (not shown), which may be coupled and movable to an opposite end (not shown) of the main body 154. The first shearer arm assembly 162 may include a cutting drum 168 that may be moved to engage the mine face 116, and/or may be rotated about an axis upon engagement with the mine face 116. In that manner, the cutting drum 168 may help shear and extract material from the mine face 116. A similar cutting drum (not shown) may be provided on the second arm assembly.

For enabling an effective operation of the shearer 110 and to perform one or more of the aforementioned shearer functions, such as of moving along the pan line 138, operating the cutting drums (e.g., cutting drum 168), shearing the material from the mine face 116, etc., services such as power, plumbing, and the like, need to be provided to the shearer 110. The cable handling system 112 facilitates the supply of such services to the shearer 110.

Figure 2:
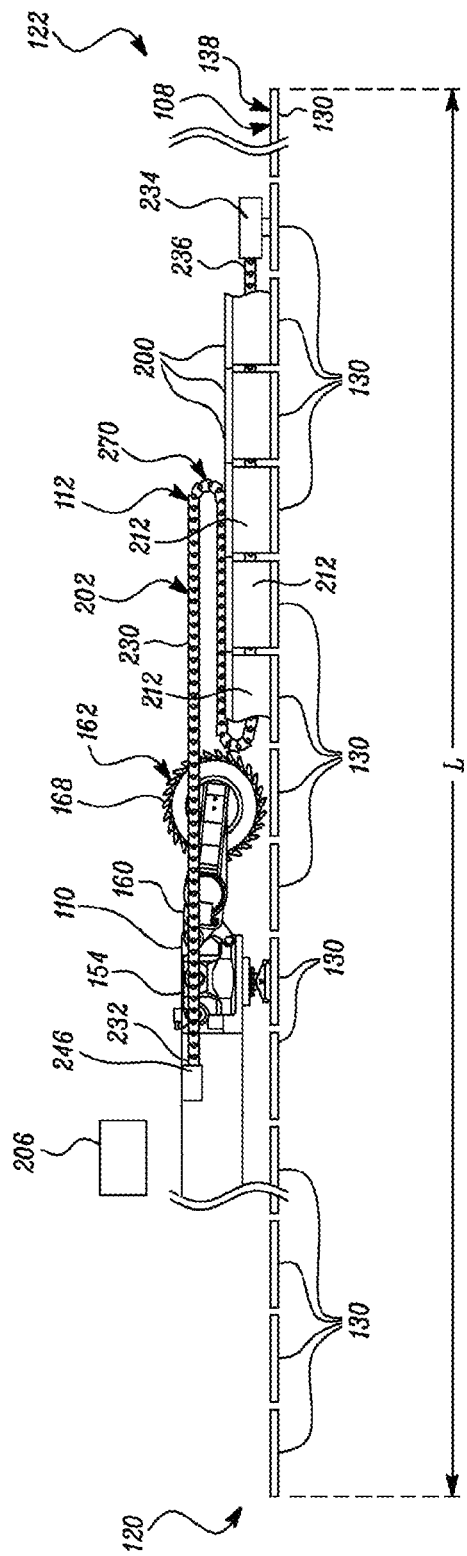
FIG. 2 is a diagrammatic view of interconnected trays defined along the pan line with a service line for the shearer being disposed within the interconnected trays, in accordance with the present disclosure.
Figure 3:
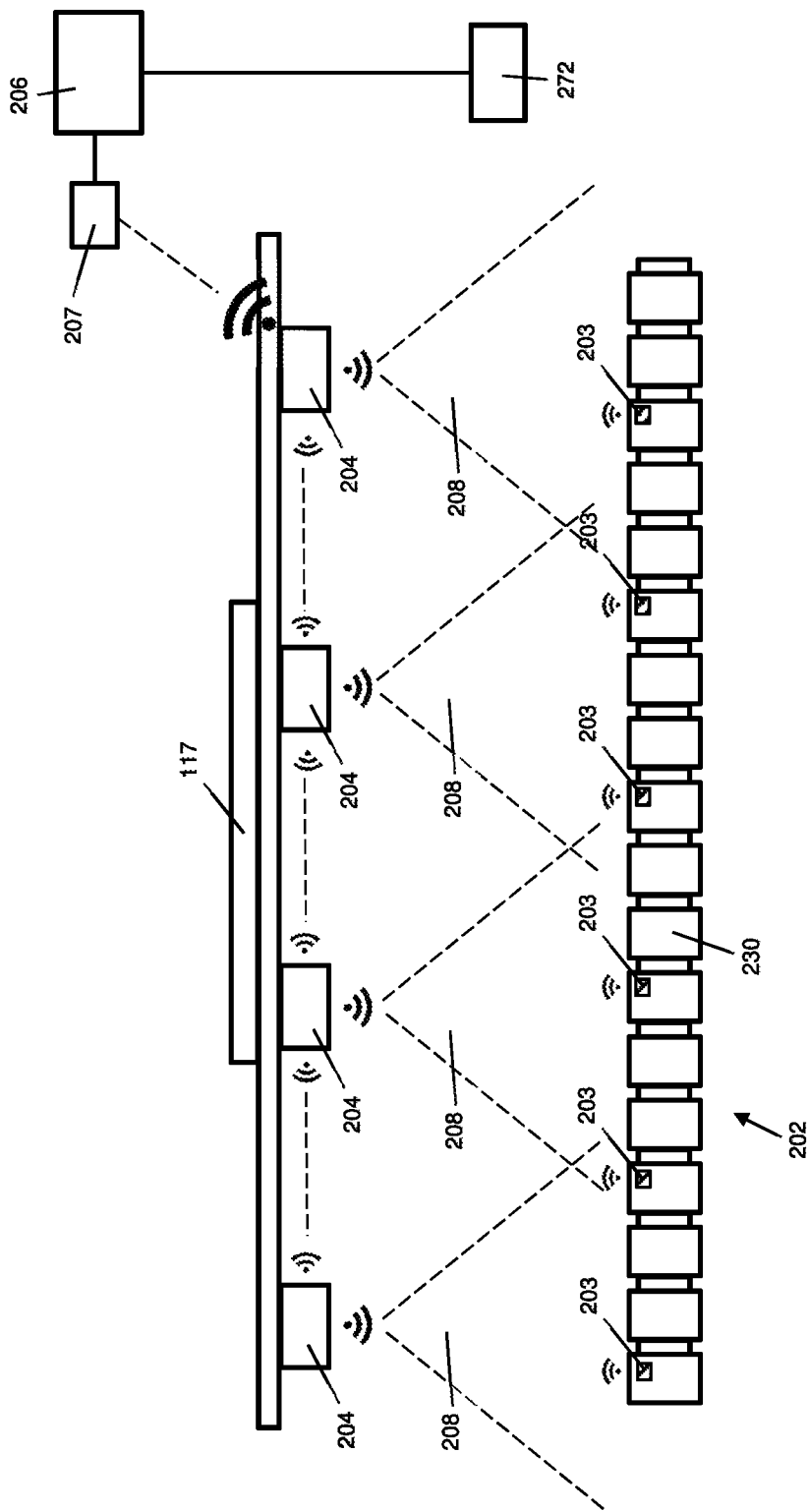
FIG. 3 is a diagrammatic view of portions of a cable handling system according to the present disclosure.

The cable handling system 112, as shown in FIGS. 2 and 3, comprises a plurality of interconnected trays 200, a service line 202 that is passed through the interconnected trays 200 to the shearer 110, a plurality of sensor nodes 203, as shown in FIG. 3, distributed along a length of the service line 202, a plurality of transceivers 204 distributed along a length of the pan line 138, and a controller 206 to control one or more aspects of the cable handling system 112.

The interconnected trays 200 may be mounted on the pan line 138. As an example, each tray 200 may include a base wall 210, and two upstanding, side walls 212, 214 extending from the base wall 210 (see FIG. 4). Further, a cavity 218 may be defined between the side walls 212, 214, and the base wall 210. The cavity 218 may have a longitudinal axis, for example parallel to the side walls 212, 214. For example, one tray 200 may be coupled or arranged (e.g., integrally) with one pan 130, and when each pan 130 is assembled with the other pan 130 to form and define the pan line 138, one tray 200 may lie in registration with an adjacent tray 200. In so doing, the cavities (such as cavity 218) of each tray 200 may combinedly define a service trough 226 along the length, L, of the pan line 138, within which the service line 202 may be freely disposed. In that manner, the interconnected trays 200 are adapted to receive, accommodate, and provide passage for the service line 202, therethrough. Further, the service trough 226 may follow a profile of the pan line 138—this means that as a profile of the pan line 138 within the underground mine 102 may follow the undulations, curves, bends, highs, and lows of the profile of the underground mine 102, so may the cumulative arrangement of the interconnected trays 200 (i.e., the profile of the service trough 226) define and follow the same profile as that of the pan line 138.

The service line 202 may be configured to carry one or more supplies to the shearer 110 for facilitating shearer operation. For example, the service line 202 may include a bretby type cable handler (or simply a cable handler 230) that may be disposed within and through the service trough 226, and which may in turn hold and/or facilitate passage and routing for electrical cables, fluid lines, data and communication lines, and the like, therethrough. As an example, said electrical cables, fluid lines, data, communication lines, and the like, may extend from a source (not shown) to the shearer 110 for facilitating shearer operation. In some cases, the cable handler 230 may be fixedly coupled to the main body 154 of the shearer 110 at one end (or at a first end 232), and may be fixedly coupled to a midway region (such as to a sub-frame 234) of the pan line 138 (see FIG. 2), at another end (or at a second end 236).

The shearer 110 may include a tow bracket 246, and the first end 232 of the cable handler 230 may be operably coupled to the tow bracket 246. In so doing, the shearer 110 may receive the various inputs (from the source) required for performing the shearer operation along the mine face 116 via a connection defined by the tow bracket 246. Further, owing to shearer movement, the cable handler 230 may be moveable as well. In one example, portions of the cable handler 230 may be folded and stacked layer-by-layer, one over the other, multiple times during shearer operations. To accommodate such bends and folds, the cable handler 230 may be built to generally flex along its length.

The plurality of sensor nodes 203 are distributed along a length of the service line 202. Sensor nodes 203 may be distributed along a length of the service line 202 that consists of a whole of the length of the service line 202 or only along one or more portions of the service line 202.

The sensor nodes 203 may be mounted on or within the service line 202. For example, the sensor nodes 203 may be mounted on or within the cable handler 230.

The sensor nodes 203 may be evenly distributed at regular intervals along the length of the cable handler 230, for example every 1, 2, 3 ... n metres, etc. Alternatively, the sensor nodes 203 may be arranged at irregular intervals. Where the cable handler 230 comprises a plurality of segments that are interconnected and configured to flex relative to one another, the sensor nodes 203 may be distributed among the segments. For example, each segment, or each $2^{nd}$, $3^{rd}$, $4^{th}$ ... $n^{th}$ segment, may be provided with a sensor node 203.

The sensor nodes 203 are suitable for sensing orientation, acceleration and/or position data. Each sensor node 203 may comprise an accelerometer or inclinometer or similar sensor.

Each accelerometer or inclinometer or similar sensor may, for example, be a one-axis, two-axis or three-axis sensor. For example, the accelerometer or inclinometer may be a three-axis accelerometer or inclinometer that can measure accelerations or inclinations in the X-, Y- and Z-axis.

The orientation of the sensor in the cable handler 230 may be chosen as desired. For example, the sensor may be orientated such that any of the axes of the accelerometer or inclinometer are aligned with the longitudinal axis of the cavity 218 of the pan line 138.

In one example each sensor node 203 comprises a MEMS accelerometer, for example a three-axis MEMS accelerometer.

Each sensor node 203 may comprise more than one sensor. Multiple sensors may be provided for redundancy and/or for improving the signal-to-noise ratio of the sensed data.

Each sensor node 203 may comprise a processor for performing one or more processing steps on the orientation, acceleration and/or position data before the orientation, acceleration and/or position data is transmitted to the plurality of transceivers 204.

Each sensor node 203 may comprise a transmitter or transmitter module for transmitting data to the plurality of transceivers 204. The data transmitted may be raw sensed data or processed sensed data. The transmitter or transmitter module may be a wireless transmitter. For example, the transmitter or transmitter module may utilise Bluetooth, Bluetooth LE, WiFi, Near Field Communications (NFC), Infra-red (IR), 5G, LTE, UMTS, EDGE, GPRS, GSM, or any other form of RF based data communications.

Optionally, each sensor node 203 may comprise a receiver or receiver module for receiving data from other sensor nodes 203 and/or the plurality of transceivers 204. The data received may be, for example, signals from the transceivers 204 instructing the sensor node 203 to wake up and transmit data, data from other sensor nodes 203 for onward transmission, network data link layer signals, etc. The receiver or receiver module may be a wireless receiver. For example, the receiver may utilise Bluetooth, Bluetooth LE, WiFi, Near Field Communications (NFC), Infra-red (IR), 5G, LTE, UMTS, EDGE, GPRS, GSM, or any other form of RF based data communications.

Each sensor node 203 may comprise a power source. The power source may be a wired connection, for example running along the cable handler 230, for supplying power from a remote source. The power source may be a local energy store, for example a battery, located in or in proximity to the sensor node 203. The battery may be a rechargeable or non-rechargeable battery. The power source may be an energy harvester. In one example, the energy harvester may generate energy for the sensor node 203 from vibrations generated during operation of the longwall mining machine 100. In another example, the energy harvester may generate energy from EM induction, for example by inductive coupling with an electrical line of the service line 202.

Each sensor node 203 may comprise a capacitor for temporary storage of energy.

Each sensor node 203 may comprise a low-power sensor. Each sensor node 203 may comprise programming to control when a low-power mode of the sensor node 203 is activated. The programming may comprise, for example, software running on a computing resource. The computing resource may comprise a part of the sensor node 203. The computing resource may comprise, for example, a microprocessor.

The components of each sensor node 203 may, for example, be integrated into a sensor unit. Each sensor unit may, for example, comprise a single discrete physical package. Each sensor unit may comprise a printed circuit board, or the like, for supporting and interconnecting the components of the sensor node 203, e.g. the processor, the transmitter/transmitter module, the receiver/receiver module, the power source, memory, etc. Each sensor unit may be mounted on or within the service line 202. For example, the sensor units may be mounted on or within the cable handler 230.

Each sensor node 203 may be configured to detect orientation, acceleration and/or position in one axis or multiple axes. For the purposes of understanding operation of the sensor nodes 203 in the present disclosure a 3-dimensional co-ordinate system 180, as marked in FIG. 1, is explicitly referenced. The 3-dimensional co-ordinate system 180 includes an X-axis, a Y-axis, and a Z-axis. It may be noted that the Z-axis is a vertical axis (i.e., defined along an elevation) of the shearer 110; the X-axis is a horizontal axis (i.e., defined along the length, L, of pan line 138), and is perpendicular to the Z-axis; the Y-axis is perpendicular to both the X-axis and the Z-axis and may pass through a point of intersection of the X-axis and the Z-axis. For the purposes of the present disclosure, a yaw may mean a tilting/rotation of the sensor node 203 (and, for example, its associated portion of the cable handler 230) about the Z-axis; a roll may mean a tilting/rotation of the sensor node 203 (and, for example, its associated portion of the cable handler 230) about the X-axis; and a pitch may mean a tilting/rotation of the sensor node 203 (and, for example, its associated portion of the cable handler 230) about the Y-axis. The X-axis may be coincident with the longitudinal axis of the cavity 218 of the pan line 138 and for example parallel to the side walls 212, 214.

The plurality of transceivers 204 are distributed along a length of the pan line 138. The transceivers 204 may be spatially separate from the pan line 138. For example, the transceivers 204 may be arranged above the pan line 138. The transceivers 204 may be mounted 5 m to 10 m above the pan line 138. The transceivers 204 may be mounted to be stationary in use. In one example, the transceivers 204 may be supported from a roof support 117 extending along the mine face 116.

The transceivers 204 may be evenly distributed at regular intervals along the length of the pan line 138, for example every 5, 10, 15, 20 ... n metres, etc. Alternatively, the transceivers 204 may be arranged at irregular intervals. The plurality of transceivers 204 may be arranged linearly along the pan line 138. A path of the plurality of transceivers 204 may follow the path of the pan line 138.

The plurality of transceivers 204 may have a reception field 208 (e.g. the combined coverage of the transceivers 204 in combination) covering a whole of the length L of the pan line 138. The reception field 208 of neighbouring transceivers 204 may overlap, for example by at least 1 m, 2 m, 3 m, 4 m or more. Each transceiver 204 may have a transmission/reception range of greater than 5 m, optionally greater than 10 m, optionally greater than 12 m.

The plurality of transceivers 204 are suitable for receiving orientation, acceleration and/or position data from the plurality of sensor nodes 203 and transmitting the orientation, acceleration and/or position data to the controller 206. The controller 206, or a part of the controller 206, may be provided remote from the transceivers 204. The controller 206, or a part of the controller 206, may be integrated with the transceivers 204.

Each transceiver 204 may comprise a receiver or receiver module for receiving the orientation, acceleration and/or position data from the plurality of sensor nodes 203 wirelessly. For example, each transceiver 204 may utilise Bluetooth, Bluetooth LE, WiFi, Near Field Communications (NFC), Infra-red (IR), 5G, LTE, UMTS, EDGE, GPRS, GSM, or any other form of RF based data communications to receive data from the plurality of sensor nodes 203. In one example, each transceiver 204 comprises a Bluetooth LE node/bridge.

Each transceiver 204 may comprise (for example as part of the receiver or receiver module) an antenna, which may be a directional antenna, for receiving the orientation, acceleration and/or position data from the plurality of sensor nodes 203.

The plurality of transceivers 204 may be interconnected. The plurality of transceivers 204 may be networked together. Each transceiver 204 may comprise a network node. For example, the network may be a Local Area Network (LAN) or a Controller Area Network (CAN). Any suitable network topology may be used, for example bus, ring, star, mesh, tree, hybrid topologies etc. Any suitable connection means may be used. The network may be a wired or wireless network. The network may utilise serial or parallel buses. The network may utilise a wired connection, e.g. Ethernet, or a wireless connection, e.g. Bluetooth, Bluetooth LE, WiFi, Near Field Communications (NFC), Infra-red (IR), 5G, LTE, UMTS, EDGE, GPRS, GSM, or any other form of RF based data communications.

Each transceiver 204 may comprise a processor for performing one or more processing steps on the orientation, acceleration and/or position data before the orientation, acceleration and/or position data is transmitted to the controller 206. Additionally or alternatively, one or more processors of the transceiver may comprise a part or a whole of the controller 206.

Each transceiver 204 may comprise a transmitter or transmitter module for transmitting data to the controller 206 (either directly or via one or more other transceivers 204). The transmitter or transmitter module may be a wireless transmitter. For example, each transceiver 204 may utilise Bluetooth, Bluetooth LE, WiFi, Near Field Communications (NFC), Infra-red (IR), 5G, LTE, UMTS, EDGE, GPRS, GSM, or any other form of RF based data communications to transmit data. Additionally or alternatively, the transceivers 204 may transmit data to the controller 206 via a wired connection, e.g. via Ethernet. Additionally or alternatively, where the transceiver 204 comprises a whole or a part of the controller 206, the transmitter or transmitter module may be a means for transmitting the data internally within the transceiver 204, for example from the receiver or receiver module to one or more processors of the transceiver 204 that form a whole or a part of the controller 206. Such an internal transmission within the transceiver 204 may be a wired or wireless transmission.

Each transceiver 204 may comprise a power source. The power source may be a wired connection, for example running along the roof support 117 extending along the mine face 116 for supplying power from a remote source.

The controller 206 may reside in one location and comprise essentially one unit, for example in the form of a discrete machine such as a PC or workstation. The unit may, for example, be located remote from the shearer 110 and may be located remote from the longwall mining machine 100.

Alternatively, the controller 206 may comprise a plurality of control components that work together to carry out the functions of the controller 206. The control components may be distributed spatially. Each control component may carry out one or more functions of the controller 206. The control components may be arranged locally, for example as part of a LAN or CAN. Alternatively, the control components may be arranged widely, for example as part of a WLAN. The control components may comprise remote computing resources. The control components may comprise cloud computing resources that are interconnected via a public network such as the Internet. The control components may include, comprise or consist of components, e.g. processing resources, that form part of the transceivers 204 and/or the sensor nodes 203.

The controller 206 may be communicably coupled to each of plurality of transceivers 204, directly or indirectly. Signals from the transceivers 204 may be relayed via a relay 207 that may in wired or wireless communication with the transceivers 204 and the controller 206. The controller 206 may be able to receive the orientation, acceleration and/or position data (raw or processed) originating from the plurality of sensor nodes 203. For example, the controller 206 may receive data pertaining to one or more of the pitch, roll, and yaw, of each of the sensor nodes 203.

The controller 206 may be able to detect an actual or imminent failure mode of the service line 202 using analysis of the orientation, acceleration and/or position data from the plurality of the sensor nodes 203. The failure mode may comprise, for example, one or more of a dislodging of the service line 202 from the plurality of interconnected trays 200, or an adverse bending of the service line 202.

The detection of an actual or imminent failure mode of the service line 202 may be performed remote from the service line 202, e.g. at a unit, for example in the form of a discrete machine such as a PC or workstation, located remote from the service line 202. Alternatively, the detection of an actual or imminent failure mode of the service line 202 may be performed locally, for example by one or more control components of the controller 206 that form part of the transceivers 204 and/or the sensor nodes 203.

The controller 206 may be able to transfer the result of such detection to a user, operator, supervisor, and the like, stationed either in situ or remote to the longwall mining machine 100. For example, via a visual and/or audible alarm that may be used for raising an alert. In one example, the cable handling system 112 may include an output device 272 by which the controller 206 may notify alerts. For example, the output device 272 may be coupled to or may include an audible means, a visual means, or a combined audio-visual means to alert one or more workers in situ, such as the ones stationed in the vicinity of the service line 202, or one or more remotely managing machine operators and supervisors. In one example, the output device 272 is an operator/supervisor workstation or a portable device by which an operator may readily be able to gather the working of the cable handling system 112.

The controller 206 may detect an actual or imminent failure mode of the service line 202 by analysing the orientation, acceleration and/or position data from the plurality of the sensor nodes 203, and in particular, by analysing data received from multiple sensor nodes 203. The analysis may comprise comparing the orientation, acceleration and/or position data from a first subset of the plurality of the sensor nodes 203 with the orientation, acceleration and/or position data from a second subset of the plurality of the sensor nodes 203.

The analysis may comprise detecting the relative movement of one or more of the sensor nodes 203 relative to one or more other sensor nodes 203. Additionally or alternatively, the analysis may comprise detecting the absolute movement of one or more of the sensor nodes 203. For example, the analysis may comprise determining an absolute orientation and/or an absolute position (relative to an external fixed frame of reference) of at least a subset of the plurality of the sensor nodes 203.

The controller 206 may be connected, for example wirelessly, to the longwall mining machine's electronic control module (ECM) (not shown) to enable the controller 206 to shut down operation of the longwall mining machine 100 on detection of an actual or imminent failure mode of the service line 202.

INDUSTRIAL APPLICABILITY

During operation, it may be assumed that initially the service line 202 is disposed generally flat within the interconnected trays 200 and defines a single layer from the sub-frame 234 to the main gate end 120, for example, when the shearer 110 has moved to the farthest extents of the pan line 138 (i.e., all the way to an end stop position defined proximate to the main gate end 120). At such a shearer position, the service line 202 may form a single layer of stack within the interconnected trays 200.

As the shearer 110 leaves the main gate end 120, the service line 202 may invert direction, thereby creating a turn in the service line 202. As the shearer 110 moves further, the turned service line portion may move as well, laying and traversing atop a first (underlying) layer of the service line 202, and may accordingly define a second layer in the stack 270 of the service line 202. The created turn may follow behind the shearer 110. Due to the typical cutting sequence in the longwall mining machine 100, the shearer 110 may often change its direction before completing a shear cycle, and may repeatedly travel back-and-forth across the mine face 116. In some cases, accordingly, as the shearer 110 direction may again be reversed, the service line 202 may again create further turns, and, accordingly, on every such turn, the service line 202 may increment the count of the layer forming the stack 270.

The aforementioned operational aspect describes a general working of the shearer 110 along the pan line 138. During such operation of the shearer 110, and in light of the profile of the pan line 138 (that may include bends, curves, etc.), and a typical pattern of shearer operation as discussed above, it may become possible for the service line 202 to suffer a failure mode, for example a dislodgment and escape of the service line 202 from the interconnected trays 200. Certain aspects of the present disclosure are set to detect an actual or imminent failure mode.

Figure 5:
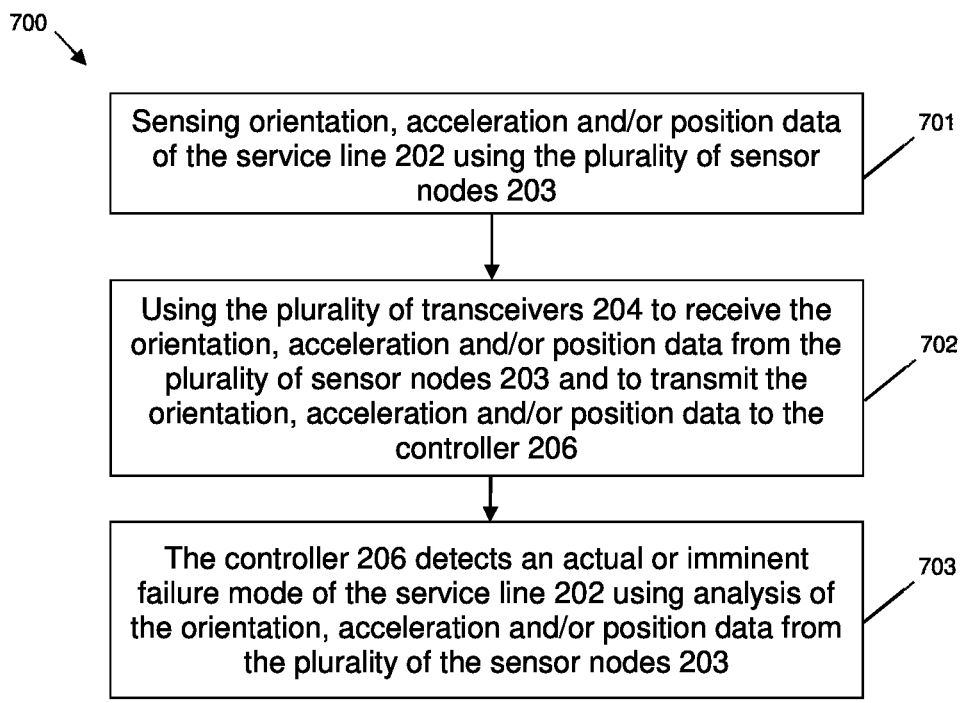
FIG. 5 is an exemplary method for operating the cable handling system, in accordance with the present disclosure.

Referring to FIG. 5, a method 700 for detecting an actual or imminent failure mode comprise in a first step 701 sensing orientation, acceleration and/or position data of the service line 202 using the plurality of sensor nodes 203.

In a second step 702 the plurality of transceivers 204 are used to receive the orientation, acceleration and/or position data from the plurality of sensor nodes 203 and to transmit the orientation, acceleration and/or position data to the controller 206. As noted above, the controller 206 may be, for example, a discrete machine such as a PC or workstation, located remote from the service line 202. In such a case the transmission of the orientation, acceleration and/or position data may comprise a transmission, e.g. by wired or wireless means, from the plurality of transceivers 204 to the remotely-located controller 206. Alternatively, also as noted above, the controller 206, or a part of the controller 206, may form part of the transceivers 204 and/or sensor nodes 203. In such a case the transmission of the orientation, acceleration and/or position data may comprise an internal transmission within the one or more transceivers 204 or within the one or more sensor nodes 203 or between the sensor nodes 203 and the transceivers 204.

In a third step 703 the controller 206 detects an actual or imminent failure mode of the service line 202 using analysis of the orientation, acceleration and/or position data from the plurality of the sensor nodes 203.

The skilled person will understand from the present disclosure that the function of the controller 206 may be performed by one or more units that may be distributed spatially and one or more functions of the controller 206 may be performed by one or more of: the sensor nodes 203, the transceivers 204 and computing resources that located remote from the shearer 110 and may be located remote from the entire longwall mining machine 100.

In the second step 702, at any point in time, orientation, acceleration and/or position data from any of the plurality of sensor nodes 203 may be received by the plurality of transceivers 204 due to the reception field of the transceivers 204 covering the whole length, L, of the pan line 138. Consequently, the cable handling system 112 may be enabled to detect an actual or imminent failure mode at any point along the length, L, of the service line 202 at all times.

The orientation, acceleration and/or position data from the plurality of sensor nodes 203 may be transmitted to the transceivers 204 on a continuous or intermittent basis. For example, the sensor nodes 203 may be configured to transmit data at fixed time intervals. The sensor nodes 203 may be configured to enter a low-energy state in between transmissions. The sensor nodes 203 may be configured to sense orientation, acceleration and/or position data at a higher frequency than the frequency of transmission of the data to the transceivers 204. In this case the sensor nodes 203 may comprise memory for storing and collating data for transmitting at a later time point.

During an actual or imminent failure mode of the service line 202 a portion of the service line 202, and in particular a portion of the cable handler 230, may undergo an unexpected event that may be detected by the controller 206 using the orientation, acceleration and/or position data from the plurality of sensor nodes 203.

The controller 206 may detect an unexpected event using the absolute orientation, acceleration and/or position of the sensor nodes 203. Additionally, or alternatively, the controller 206 may detect an unexpected event using the orientation, acceleration and/or position of the sensor nodes 203 relative to each other.

The controller 206 may detect the unexpected event without needing to have knowledge of the overall profile of the pan line 138. Consequently, there may be no requirement for the cable handling system 112 to being programmed with, or to plot, the profile of the pan line 138.

In one example, the unexpected event may comprise a movement in a transverse direction, i.e. in the Y-axis, or comprising a movement having at least a component in the transverse direction. Referring to the example figure of FIG. 4, a transverse movement in that example would be a movement to the left or right in the orientation as shown. A sudden movement or acceleration having at least a component in the Y-axis above a threshold amount may be considered an unexpected event since in practice the curves and bends of the pan line 138 in the plane of the Y-axis have a relatively large radius of curvature, i.e. sharp bends and curves are typically avoided.

For example, a sudden movement or acceleration having at least a component in the Y-axis above a threshold amount may be indicative that the service line 202 has moved past or started to move past (i.e. over) one of the side walls, 212, 214. The controller 206 may determine that the degree of the movement in the Y-axis is unexpected by comparing the absolute magnitude of the movement or acceleration to a pre-determined threshold. Alternatively, the controller 206 may determine that the degree of the movement in the Y-axis is unexpected by comparing the orientation, acceleration and/or position of the sensor nodes 203 relative to each other. For example, if a first subset of the sensor nodes 203 is detected as moving significantly (e.g. above a threshold mount) in the Y-axis compared to a second subset of sensor nodes 203 that are proximate the first subset this may be indicative of a localised actual or imminent failure of the service line 202. For example this may be indicative of an adverse bend developing in the service line 202 or a portion of the service line 202 being dislodged from the interconnected trays 200.

Figure 4:
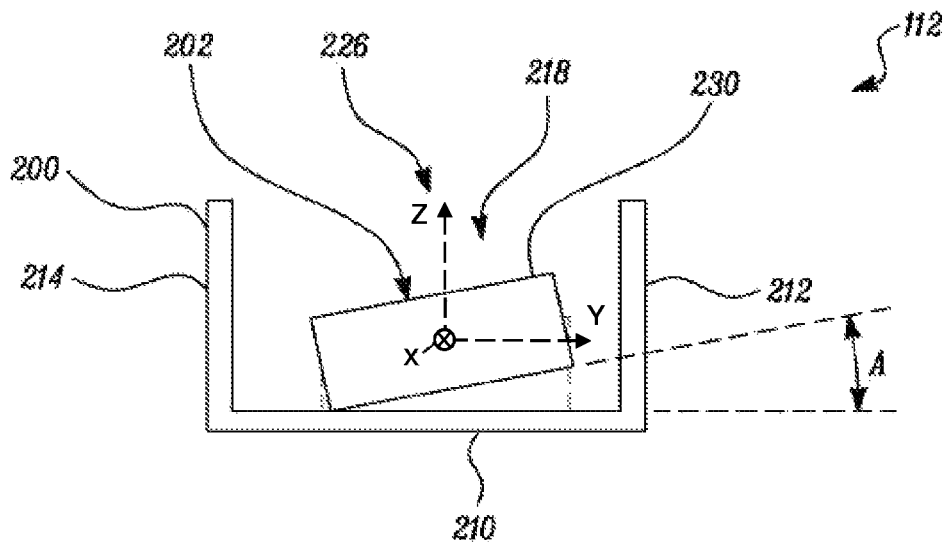
FIG. 4 is a diagrammatic view showing an orientation of the service line vis-à-vis the interconnected trays.

In another example the unexpected event may comprise or consist of a rolling movement or acceleration about the X-axis as shown in FIG. 4 such that a portion of the cable handler 230 is tilted at an angle A to the base wall 210 of the interconnected trays 200. Such a movement or acceleration may be indicative that the service line 202 has started to fall out of the interconnected trays 200 creating a twisting or warping shape to a portion of the cable handler 230. The controller 206 may determine that the degree of the rolling movement or acceleration about the X-axis is unexpected by comparing the absolute magnitude of the movement or acceleration to a pre-determined threshold. Alternatively, the controller 206 may determine that the degree of the rolling movement about the X-axis is unexpected by comparing the orientation, acceleration and/or position of the sensor nodes 203 relative to each other. For example, if a first subset of the sensor nodes 203 is detected as moving significantly (e.g. above a threshold mount) about the X-axis compared to a second subset of sensor nodes 203 that are proximate the first subset this may be indicative of a localised actual or imminent failure of the service line 202. For example this may be indicative of a portion of the service line 202 being dislodged from the interconnected trays 200 or the service line 202 encountering an obstruction (e.g. rock debris) in the interconnected trays 200.

In the event that the controller 206 detects that there exists an actual or imminent failure mode of the service line 202 it may issue an alert, for example via the output device 272. Additionally or alternatively, the controller 206 may instigate a shut down of the operation of the longwall mining machine 100 by communicating with the ECM of the longwall mining machine 100. The shut down may be automatic (without user intervention). Additionally or alternatively, the controller 206 may raise a system alert when an actual or imminent failure mode of the service line 202 is detected. The system alert may be provided to an operator or to another part of the control system for appropriate action to be taken.

It will be apparent to those skilled in the art that various modifications and variations can be made to the method and system of the present disclosure without departing from the scope of the disclosure. Other embodiments will be apparent to those skilled in the art from consideration of the specification and practice of the method and system disclosed herein. It is intended that the specification and examples be considered as exemplary only, with a true scope of the disclosure being indicated by the following claims and their equivalent.

What is claimed is:

1. A method of operating a cable handling system of a longwall mining machine having a shearer movable along a pan line to mine material along a mine face, the cable handling system including:
   i) a service line configured to carry one or more supply lines to the shearer for facilitating shearer operation,
   ii) a plurality of interconnected trays to accommodate the service line,
   iii) a plurality of sensor nodes distributed along a length of the service line,
   iv) a plurality of transceivers distributed along a length of the pan line, and
   v) a controller, wherein the method comprises:
   a) sensing and transmitting orientation, acceleration and/or position data of the service line using the plurality of sensor nodes,
   b) using the plurality of transceivers to receive the orientation, acceleration and/or position data from the plurality of sensor nodes and to transmit the orientation, acceleration and/or position data to the controller, and
   c) detecting, by the controller, an actual or imminent failure mode of the service line using analysis of the orientation, acceleration and/or position data from the plurality of the sensor nodes by at least comparing the orientation, acceleration and/or position data from a first subset of the plurality of the sensor nodes with the orientation, acceleration and/or position data from a second subset of the plurality of the sensor nodes.

2. The method of claim 1, wherein the plurality of transceivers have a reception field covering a whole of the length of the pan line such that, in step b), at any point in time orientation, acceleration and/or position data from any of the plurality of sensor nodes is receivable by the plurality of transceivers.

3. The method of claim 1, wherein, in step c), analysis of the orientation, acceleration and/or position data from the plurality of the sensor nodes comprises determining an absolute orientation and/or an absolute position of at least a subset of the plurality of the sensor nodes.

4. The method of claim 1, wherein the failure mode comprises one or more of:
   dislodging of the service line from the plurality of interconnected trays; or
   adverse bending of the service line.

5. The method of claim 1, wherein each of the plurality of interconnected trays comprises a base wall, a first side wall and a second side wall together defining a cavity for receiving a portion of the service line, the cavity having a longitudinal axis; and the orientation, acceleration and/or position data of the service line comprises data for detecting or inferring at least a component of movement of the service line in a transverse direction that is perpendicular to the longitudinal axis, the first side wall and the second side wall.

6. The method of claim 1, wherein the plurality of transceivers are interconnected to form a network, optionally a mesh network.

7. The method of claim 1, further comprising step d) raising an alert and/or automatically stopping the longwall mining machine when an actual or imminent failure mode of the service line is detected.

8. A cable handling system for a longwall mining machine, the longwall mining machine including a shearer configured to move along a pan line to mine material along a mine face, the cable handling system comprising:
  i) a service line configured to carry one or more supply lines to the shearer for facilitating shearer operation,
  ii) a plurality of interconnected trays to accommodate the service line,
  iii) a plurality of sensor nodes distributed along a length of the service line,
  iv) a plurality of transceivers distributed along a length of the pan line, and
  v) a controller configured to:
    a) receive orientation, acceleration and/or position data of the service line that originates from the plurality of sensor nodes, is transmitted to the plurality of transceivers, and is then transmitted to the controller by the plurality of transceivers, and
    b) analyse the orientation, acceleration and/or position data to detect an actual or imminent failure mode of the service line by at least comparing the orientation, acceleration and/or position data from a first subset of the plurality of the sensor nodes with the orientation, acceleration and/or position data from a second subset of the plurality of the sensor nodes.

9. The cable handling system of claim 8, wherein the plurality of transceivers are distributed along a whole of the length of the pan line such that a reception field of the plurality of transceivers enables, at any point in time, orientation, acceleration and/or position data from any of the plurality of sensor nodes to be receivable by the plurality of transceivers irrespective of a degree of extension of retraction of the service line along the pan line.

10. The cable handling system of claim 8, wherein the plurality of transceivers are interconnected to form a network, optionally a mesh network.

11. The cable handling system of claim 8, wherein the plurality of transceivers are arranged above the pan line; and are optionally supported from a roof support extending along the mine face.

12. The cable handling system of claim 8, wherein the controller is configured to determine an absolute orientation and/or an absolute position of at least a subset of the plurality of the sensor nodes.

13. The cable handling system of claim 8, wherein the controller is configured to detect a failure mode that comprises one or more of:
  dislodging of the service line from the plurality of interconnected trays; or
  adverse bending of the service line.

14. The cable handling system of claim 8, wherein each of the plurality of interconnected trays comprises a base wall, a first side wall and a second side wall together defining a cavity for receiving a portion of the service line, the cavity having a longitudinal axis; and the orientation, acceleration and/or position data of the service line comprises data for detecting or inferring at least a component of movement of the service line in a transverse direction that is perpendicular to the longitudinal axis, the first side wall and the second side wall.

15. The cable handling system of claim 8, further comprising a visual and/or audible alarm for raising an alert; and/or the controller is configured to automatically stop the longwall mining machine when an actual or imminent failure mode of the service line is detected; and/or the controller is configured to raise a system alert when an actual or imminent failure mode of the service line is detected.

* * * * *